Feb. 9, 1937.  C. T. WALTON  2,070,073
FILTER
Filed July 23, 1935
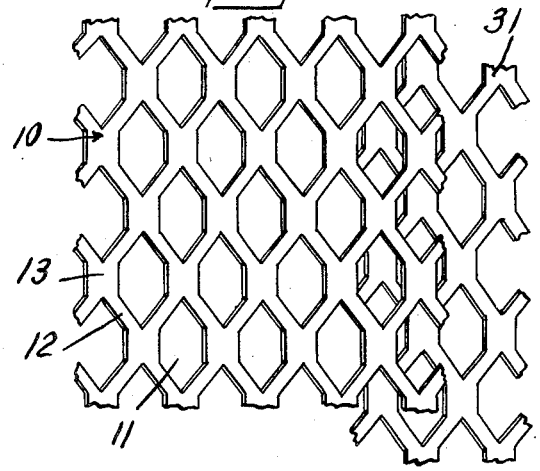
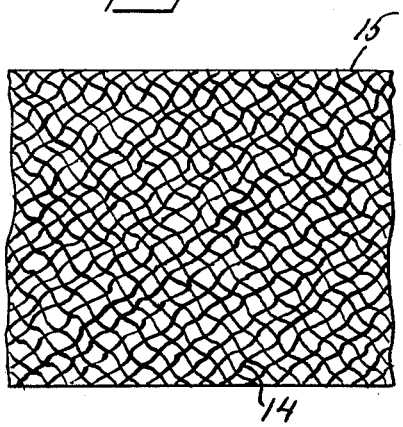
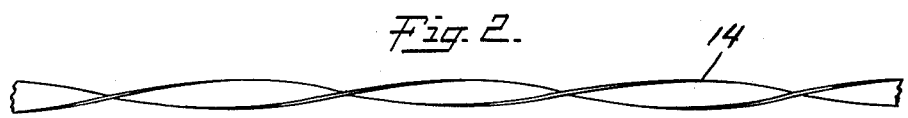
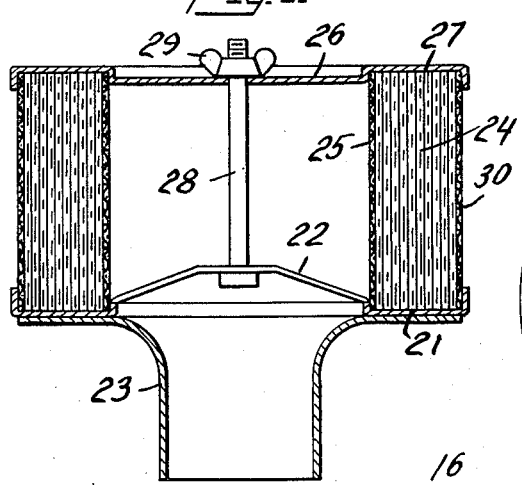
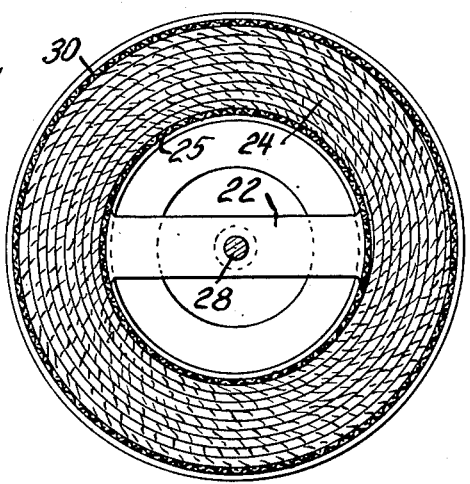
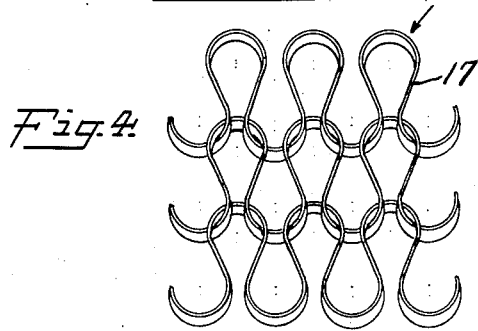
INVENTOR
Clifford T. Walton
BY
Pennie, Davis, Marvin & Edmonds
ATTORNEYS Patented Feb. 9, 1937

2,070,073

UNITED STATES PATENT OFFICE 2,070,073

FILTER

Clifford T. Walton, Madison, Wis., assignor to C. F. Burgess Laboratories, Inc., Chicago, Ill., a corporation of Delaware Application July 23, 1935, Serial No. 32,751

11 Claims. (Cl. 183—69)

This invention relates to filters for gases and more particularly to air cleaners for the intakes of internal combustion engines. It is not limited to such use, however, but is adapted for general use for ventilating and industrial purposes wherever it is desired to remove dust or other solid particles from air or other gases. It relates to the class of filters which comprises an intersticial mass of oil coated material. The filter body is dipped or otherwise treated with oil. The air or other gas, in passing through the mass, repeatedly encounters oil-covered surfaces and the solid particles carried thereby adhere to the said surfaces because of the viscous character of the coatings.

It is an object of the invention to provide a gas filter possessing greater filtering efficiency and offering less restriction to the flow of the gas therethrough than filters which are known heretofore.

It is a further object of the invention to provide a gas filter of the character mentioned which has high oil-carrying and oil retaining capacity.

It is another object of the invention to provide a filter body of the character mentioned which is of compact and substantially unitary construction.

It is a still further object of the invention to provide an inexpensive filter body, particularly for air cleaners of automobiles, which may be disposed of after it has become dirty and replaced with a new one, instead of being cleaned and re-oiled for further service.

Other advantages will become apparent as the following description progresses.

The gas filtering material of this invention comprises a formed, open mesh fabric of non-metallic oil-absorptive substance. Gas filtering materials have been made heretofore of open mesh metal fabric but non-metallic, and particularly fibrous fabric possesses superior properties for gas filtering purposes. Such material possesses oil-absorbing properties with the result that relatively large quantities of oil are carried by it and oil is replenished at the surfaces by capillary movement from the interior as it is taken up by the dust and dirt or is carried away by the flowing stream of gas. This results in higher filtering efficiency and the maintaining of such efficiency for long periods of use. In addition, there are numerous advantages attendant upon the use of flexible fibrous material which will be discussed hereinafter in connection with the examples of filtering bodies illustrated.

The fabric of this invention may take a number of specific forms but in general it is in the form of a flat sheet or layer having a large proportion of its area open in the form of evenly distributed openings and having the solid portions in the form of a network of flat strips or strip-like sections having the major portions of their surfaces disposed angularly to the general plane of the fabric so as to impart a deflecting action upon the gas passing therethrough. A plurality of such layers preferably are arranged in a superposed relation and the air or other gas is caused to pass therethrough in a direction substantially normal to the planes of the sheets or layers.

In the drawing:

Fig. 1 is a fragmental perspective view of one form of filtering material of this invention in which a pattern of openings is formed out of sheet material;

Fig. 2 is an enlarged fragmental view of a twisted strand used in a modified form of the filtering material of this invention;

Fig. 3 is a fragmental view of a layer of filtering material employing the twisted strand of Fig. 2;

Fig. 4 is a fragmental view of a further modification of the filtering material of this invention;

Fig. 5 is a vertical, sectional view of a cylindrical filtering unit employing any of the open pattern sheet materials illustrated in Figs. 1 to 4; and Fig. 6 is a horizontal, sectional view of the unit shown in Fig. 5.

As stated heretofore, the filter of this invention is composed of non-metallic, preferably fibrous substance. While any flexible substance having the desired oil-absorbing properties may be used, I prefer a relatively heavy paper such as kraft paper, which is an inexpensive raw material, is strong and possesses a high degree of oil-absorptiveness.

The filter fabric may be made in several ways, as by weaving or knitting flat strands into an open pattern, as will be described more in detail hereafter, but I prefer to make it by punching and forming it from a paper sheet. Such a fabric is illustrated in Fig. 1. In this and the other figures the fabric is shown in narrow, elongated form adapted for use in automobile air cleaners. Spaced slits are cut or punched into the sheet, after which it is expanded in a direction transverse to the slits. The slits are of the proper length and spacing so as to produce upon expanding the desired character of open spaces and connecting network of narrow strip-like sections or webs.

Paper and other non-metallic sheet materials are more or less resilient and expanded sheets of such materials are springy and tend to return to their unexpanded condition. For this reason it is desirable to impart sufficient stiffness or rigidity to the material to cause it to remain in its expanded condition. This may be accomplished by treating it with a size, such as glue or casein, and a plasticizer, such as glycerine, or by treating it with a dilute solution of sodium silicate in water and drying it while in expanded condition, or by coating it with a plastic substance such as varnish, shellac, phenol condensation resin, etc., and expanding it while the substance is plastic and permitting the latter to set before releasing the tension. A preferred method comprises coating the sheet material, either before or after the slitting operation with a thermoplastic substance, for example, a vinyl acetate resin, simultaneously heating and expanding the sheet material and then allowing the same to cool while in the expanded condition. This process has the advantage that the setting takes place simultaneously with cooling. The coated strip remains permanently in its expanded condition, but it possesses sufficient flexibility so that it may be bent, rolled up or folded into any desired shape. The stiffening treatment imparts strength to the fabric and prevents the softening and weakening thereof which might otherwise result from the absorption of oil.

Filtering efficiency varies as the dimensions of the openings and webs of the expanded material are changed. Good efficiency has been obtained with the dimensions resulting from the use of slits ⅜ inch long and spaced 1/16 inch laterally from each other. With the sheet 10 expanded as shown in Fig. 1 this results in openings 11 which are slightly less than ⅜ inch in length, diagonal webs 12 of 1/16 inch width and vertical webs 13 of ⅛ inch width. It is understood that the invention is not limited to the dimensions given but contemplates any dimensions which provide the requisite filtering efficiency. In expanding the sheet material the surfaces of webs 12 and 13 arrange themselves at an angle to the plane of the sheet, which angle is substantially uniform and in the same direction for all of the webs. Because of this, a stream of gas passing through the material in a direction normal to the plane of the sheet encounters diagonal surfaces and is deflected rather than obstructed, which is a condition that is essential for high filtering efficiency.

The fabric shown in Fig. 1 may be obtained by punching and forming operations instead of by slitting and expanding. The openings 11 may be punched out in their final shape and size, and the sheet may be moistened, as by steaming, to render it more flexible and then passed between forming dies which impart the desired diagonal arrangement to the webs, after which it may be dried and the stiffening substance applied thereto. It is apparent that the strip material may be punched and formed into any desired pattern of openings and connecting webs.

As stated heretofore, the filtering fabric may be composed of woven flat strands of non-metallic and preferably fibrous material. Such a fabric is shown in Fig. 3. The flat strands 14 are twisted as shown in Fig. 2 and are woven in such twisted condition into a fabric 15 having the adjacent strands spaced from each other a distance at least equal to the width of the strands. The fabric shown in Fig. 3 is tubular in form, which, for use, is flattened together to form a double-layer sheet or strip. However, it may be woven into flat sheet form and the sheets may be cut into strips of the desired width. The material may be given a treatment for stiffening and preventing the weakening by oil, as described heretofore. Because of the looseness of the weave, in making flat strips the strands should be fixed in their relative positions by means of an adhesive. With fabric which has been treated with thermoplastic substance this may be accomplished by heating and cooling the fabric, when the substance softens and unites the strands. In this fabric the twisting of the strands provides surfaces disposed at various angles to the gas stream with the resulting deflecting action which provides high filtering efficiency without excessive restriction to gas flow.

Figure 4 illustrates a fabric 16 composed of knitted flat strands 17 of fibrous material, such as heavy paper. As is shown in Fig. 4 the broad surfaces of strands 17 are disposed at various angles to the general plane of the fabric, providing the desired deflecting action. The fabric may be knitted into strips of indefinite length or into sheets which are subsequently cut into strips. In the latter case the strands should be fixed in their relative positions by an adhesive. The strands 17 may be twisted as described in connection with the strand shown in Fig. 2.

The fabric may also be knitted into tubular form and flattened into a double-layer sheet or strip. This fabric should also be given a treatment for stiffening the same and preventing the weakening thereof by oil absorption. The stiffening treatment may be applied at any convenient stage of the production process and may be applied to the filter body after it has been completely formed.

The fabrics shown in Figs. 1, 3 and 4 are adapted to be arranged in superposed layers with the planes of such layers substantially normal to the direction of the gas stream to form filter bodies. An example of such a filter body is illustrated in Figs. 5 and 6. This filter is adapted for use as an air cleaner for automobile engines and comprises a base member comprising an annular seating portion 21 having a bracket 22 extending diametrically between opposite sides thereof, and having a tubular extension 23 adapted to be connected to the carburetor intake. The cylindrical filtering unit 24, comprising a plurality of superimposed layers of the strip material, which may be any of the forms shown in Figs. 1, 3 or 4, rests upon base member 21 and is faced interiorly and exteriorly with cylindrical wire mesh retaining members 25 and 30, respectively. A circular cover member 26 tops the filtering unit 24 and has an annular depressed area 27 to fit over said unit. Bolt 28 and wing nut 29 serve to clamp the base and cover members together and hold the filtering unit securely in position.

The filtering unit 24 may be made by rolling an elongated strip or flattened tube of the fabric into a cylinder of the desired dimensions. It may also be formed by arranging a plurality of individual cylinders of the fabric in nested relation. The filtering unit may be fitted over the interior wire mesh cylinder 25 and the exterior facing cylinder 30 may be fitted over the filtering unit and the assembly may be oiled and introduced into the air cleaner frame as a unit. If desired, facing cylinders 25 and 30 may be dispensed with and the layers of the cylindrical unit 24 may be united by an adhesive into fixed, permanent form. With the material which has been treated with thermoplastic substance, this may be accomplished by merely heating and cooling the unit. If the facing cylinders are omitted from the filtering unit, the interior wire mesh cylinder 25 may be mounted independently upon base member 21 and serve as a means for assisting in positioning the filtering unit and spacing the base and cover members apart. It also acts as a fire stop for preventing fire from the motor from reaching the filtering unit. In such case the filtering unit may be inserted and removed by slipping it over the wire mesh cylinder 25. In this way a relatively inexpensive filtering unit is provided which, upon becoming dirty, may be discarded and replaced with a new one instead of being washed, reoiled and put back into service.

The air passes radially inward through filtering unit 24 and then axially downward through tube 23 and into the carburetor intake. With the flexible fabric materials of this invention close joints are obtained between the top and the bottom of the filtering unit and the cover and base members of the supporting frame respectively. The longitudinal edges of the several layers coincide closely and any projecting ends of strands along cut edges are bent and flattened down. Such joints prevent the ready passage of the air around the edges of the filtering unit, which frequently occurs in air cleaners employing metallic filtering materials or bunched or wound strands or fibers.

In a filter of this character, employing fabric sheet material, the openings are of uniform size and the porosity is uniform throughout the mass, a condition which improves the filtering efficiency and which is practically impossible of attainment with filters employing bunched or wound strands or fibers. In addition, the openings are relatively large, providing internal repositories of high capacity for the dust.

It has been found that improved efficiency and less restriction are obtained if the locations of openings of successive layers of the sheet material are arranged so as to be out of register with one another. For instance, in the fabric of Fig. 1, the openings of strip 10, which is shown to be in front, are out of register with the openings of the strip 31, which is shown to be in the rear. Similar arrangements may be made with the other fabric materials.

With the fabric shown in Fig. 1 greater filtering efficiency and less restriction to air flow are obtained if alternate layers of the expanded material are arranged oppositely so that the surfaces of webs 12 and 13, which are at an angle to the general plane of the fabric, as explained heretofore, incline in one direction in one layer and in the opposite direction in the next succeeding layer. By this means, the stream of air passing through the filtering unit is deflected in opposite directions as it passes through each successive layer. This arrangement may be accomplished by placing two strips in parallel contiguous relation with the webs disposed oppositely as explained and rolling them together into the cylindrical form.

As stated heretofore, the fibrous filtering material of this invention has the advantage of possessing oil absorptiveness and hence has higher oil-carrying and oil-retaining properties than do metallic filtering materials. Even with material having coatings of plastic substance or the other treatments described heretofore, the oil is absorbed to an appreciable extent into the material itself and in addition, there is greater adherence of oil to the surfaces because the latter are not as smooth as the surfaces of metallic filtering materials. Greater oil-carrying capacity is exhibited by material which is punched or cut after, rather than before, the treatment has been applied. The cut edges absorb the oil more readily than do the broad surfaces. Accordingly, if it is desired to increase the oil-absorptiveness, small holes of the order of pin-holes may be made in the material after the coating has been applied. Oil-absorptiveness may be increased also by applying the treatments mentioned heretofore to the fabric material in discontinuous patterns.

In addition to paper, other non-metallic sheet materials may be used which possess the required strength. Any sheet material made from cellulose fibers, such as wood, cotton, corn stalks, etc. may be used, and also sheet material composed of asbestos fibers, regenerated cellulose, cellulose esters and ethers, and other gelatinous film-forming materials. Laminated materials may be used also in which several sheets of the same or different non-metallic materials are joined by an adhesive or otherwise.

It is possible also to use laminated metallic and non-metallic sheet materials. This provides the advantages peculiar to non-metallic materials and also the greater stiffness possessed by metals. For instance, paper sheet material having copper foil electroplated upon a surface thereof may be used. Such material may be used without any stiffening coating.

The non-metallic materials are resistant to the conditions which they encounter in air cleaners of automobiles, such as moisture, heat and backfiring, and do not deteriorate with use. They may be treated with a fire-proofing composition, such as a dilute solution of ammonium phosphate or borax in water to increase their resistance to fire. After the filtering units become dirty with use, they may be cleaned by washing with gasoline, and may be re-oiled and re-used indefinitely. However, the paper filtering units are inexpensive and may be discarded after becoming dirty, as explained heretofore. The non-metallic materials are light in weight and relatively soft and flexible and are easily worked into the desired form, and the units do not rattle under the vibrating conditions of automobile use, as do metallic filter units. If particles become loosened and pass into the motor they are too soft to cause scoring of the cylinders or pistons, and are eventually destroyed by the heat. With fabric materials there is little or no such loosening of particles as occurs with bunched or wound strands or fibers. The non-metallic materials are not affected by corrosive conditions. This is of great value in industrial filters where it is desired to filter gases or air containing corrosive substances.

While a cylindrical filtering unit has been described and illustrated, it is understood that the invention is not limited thereto, but is intended to include any shape desired. For instance, the unit may comprise a number of parallel flat sheets of fabric placed in a frame or united into an integral unit and arranged with the planes of the sheets normal to the gas stream.

I claim:
1. A gas filtering body comprising a plurality of superposed layers of open mesh sheet form fabric of thin flexible, cellulosic substance, the network of said fabric comprising narrow substantially flat surfaces, disposed angularly to the general plane of said fabric.

2. A gas filtering body comprising a plurality of superposed layers of open mesh sheet form fabric of thin fibrous substance, the network of said fabric comprising narrow, substantially flat surfaces disposed angularly to the general plane of said fabric.

3. A gas filtering body comprising a plurality of superposed layers of open mesh thin paper fabric, the network of said fabric comprising narrow, substantially flat surfaces disposed angularly to the general plane of said fabric.

4. A gas filtering body comprising a plurality of superposed layers of open mesh sheet form fabric of fibrous substance, the network of said fabric being in the form of thin, narrow, substantially flat strips or webs having their broad surfaces disposed angularly to the general plane of said fabric.

5. A gas filtering body comprising a plurality of superposed layers of open mesh sheet form fabric of laminated material, at least one lamination of said material consisting of fibrous substance, the network of said fabric being in the form of thin, narrow, substantially flat strips or webs having their broad surfaces disposed angularly to the general plane of said fabric.

6. A gas filtering body comprising a plurality of superposed layers of open mesh sheet form fabric of flexible, fibrous substance, the network of said fabric comprising thin, narrow, substantially flat strip-like sections having their broad surfaces disposed angularly to the general plane of said fabric, said network being stiffened in said form.

7. A gas filtering body comprising a plurality of superposed layers of open mesh fabric of thin expanded fibrous sheet material, the broad surfaces of the network of said fabric being disposed angularly to the general plane of said fabric.

8. A gas filtering body comprising a plurality of superposed layers of open-mesh, coarsely woven fabric of flat strands of fibrous substance, the flat surfaces of said strands being disposed angularly to the general plane of said fabric.

9. A gas filtering body comprising a plurality of superposed layers of open-mesh knitted fabric of flat strands of fibrous substance, the flat surfaces of said strands being disposed angularly to the general plane of said fabric.

10. A manufacture comprising an open mesh sheet form fabric of flexible, fibrous substance, the network of said fabric comprising thin flat, strip-like sections, the broad surfaces of said sections being disposed angularly to the general plane of said fabric, said sections being stiffened in said form by a stiffening substance carried thereby.

11. The method of making an open-mesh fabric for filtering bodies which comprises expanding a sheet of thin fibrous substance and fixing said sheet in said expanded condition by means of a stiffening substance.

CLIFFORD T. WALTON.